(12) United States Patent
Ardisana, II et al.

(10) Patent No.: US 11,921,354 B2
(45) Date of Patent: Mar. 5, 2024

(54) MAGNETIC FORCE ELECTRICAL CONTACTS

(71) Applicants: John Bernard Ardisana, II, Torrance, CA (US); Teodor Dabov, Los Angeles, CA (US); Yoav Ben-Haim, Culver City, CA (US)

(72) Inventors: John Bernard Ardisana, II, Torrance, CA (US); Teodor Dabov, Los Angeles, CA (US); Yoav Ben-Haim, Culver City, CA (US)

(73) Assignee: Snap Inc., Santa Monica, CA (US)

( * ) Notice: Subject to any disclaimer, the term of this patent is extended or adjusted under 35 U.S.C. 154(b) by 143 days.

(21) Appl. No.: 17/719,817

(22) Filed: Apr. 13, 2022

(65) Prior Publication Data

US 2022/0244577 A1    Aug. 4, 2022

Related U.S. Application Data

(63) Continuation of application No. 16/689,335, filed on Nov. 20, 2019, now Pat. No. 11,353,725.

(60) Provisional application No. 62/785,506, filed on Dec. 27, 2018.

(51) Int. Cl.
*G02C 11/00* (2006.01)
*H01R 13/62* (2006.01)

(52) U.S. Cl.
CPC ......... *G02C 11/10* (2013.01); *H01R 13/6205* (2013.01); *G02C 2200/02* (2013.01)

(58) Field of Classification Search
CPC . G02C 11/10; G02C 2200/02; H01R 13/6205

USPC ......................................................... 351/158
See application file for complete search history.

(56) References Cited

U.S. PATENT DOCUMENTS

| | | | |
|---|---|---|---|
| 6,431,705 B1 | 8/2002 | Linden | |
| 9,161,113 B1 | 10/2015 | Fenton et al. | |
| 9,482,882 B1 | 11/2016 | Hanover et al. | |
| 9,482,883 B1 | 11/2016 | Meisenholder | |
| 9,726,904 B1 | 8/2017 | Lin | |
| 9,952,452 B1 | 4/2018 | Hanover et al. | |
| 10,670,889 B1 | 6/2020 | Hanover et al. | |
| 10,698,224 B1 | 6/2020 | Cooke et al. | |
| 10,928,658 B1 * | 2/2021 | Ashwood | H05K 5/0086 |
| 10,993,515 B1 * | 5/2021 | Kim | H02J 7/0044 |
| 11,137,621 B1 | 10/2021 | Castañeda et al. | |
| 11,353,725 B1 | 6/2022 | Ardisana, II et al. | |
| 2018/0095299 A1 | 4/2018 | Cazalet et al. | |
| 2018/0217664 A1 | 8/2018 | Yamada et al. | |
| 2018/0294596 A1 | 10/2018 | Zhang et al. | |
| 2019/0033622 A1 | 1/2019 | Olgun et al. | |
| 2019/0157807 A1 | 5/2019 | Jansson et al. | |
| 2019/0165516 A1 | 5/2019 | Li et al. | |
| 2021/0231980 A1 | 7/2021 | Larson | |
| 2021/0298440 A1 * | 9/2021 | Kim | H02J 7/342 |

(Continued)

*Primary Examiner* — William R Alexander
(74) *Attorney, Agent, or Firm* — Culhane Meadows PLLC; Stephen J. Weed

(57) ABSTRACT

An electronic assembly including eyewear and/or an eyewear case having a support structure and a conductive contact surface supported by the support structure. The eyewear case includes electronic components, an electrical contact surface adapted to engage the conductive contact surface of the eyewear, a first magnet attached to the electrical contact surface, and a second magnet that is positioned to attract or repel the first magnet.

20 Claims, 7 Drawing Sheets

(56) References Cited

U.S. PATENT DOCUMENTS

2022/0197062 A1* 6/2022 Alhaideri ................ H02J 7/342
2022/0320878 A1* 10/2022 Steger ................... H02J 7/0047
2023/0018418 A1* 1/2023 Gil ........................ G06F 1/1632
2023/0054967 A1* 2/2023 Kim ..................... H02J 7/0044

* cited by examiner

MAGNETIC FORCE ELECTRICAL CONTACTS

CROSS-REFERENCE TO RELATED APPLICATIONS

This application is a Continuation of U.S. application Ser. No. 16/689,335 filed on Nov. 20, 2019, and claims priority to U.S. Provisional Application Ser. No. 62/785,506 filed on Dec. 27, 2018, the contents of which are incorporated fully herein by reference.

FIELD OF THE INVENTION

The present invention relates to electrical contacts and, more particularly, to the use of magnets in electrical contacts to produce electrical connections.

BACKGROUND OF THE INVENTION

Consumer electronics devices utilize electrical interfaces for charging and for communication with other components. An electrical interface typically include two or more contacts. A resistance is present between a conductive contact of the consumer electronics device and a mating electrical contact of the other component. The resistance is a function of the substrate material, plating material, and contact area of the respective contacts and the contact force between the contacts.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear, eyewear case, associated components and any complete devices incorporating a depth-capturing camera such as shown in any of the drawings, are given by way of example only, for illustration and discussion purposes. In operation, the eyewear may be oriented in any other direction suitable to the particular application of the eyewear, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any depth-capturing camera or component of the depth-capturing camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1:
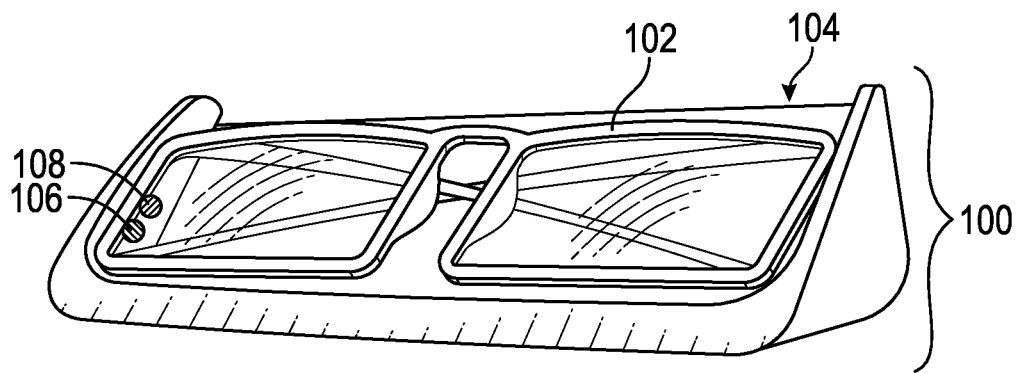
FIG. 1 is perspective view of eyewear cradled within an eyewear case, with electrical magnetic contacts within the eyewear case connected to the right side of the eyewear's frame.

FIG. 1 depicts an electronic assembly including an eyewear case 104 cradling eyewear 102 in accordance with one example. The eyewear case 104 has a housing with an opening for receiving the eyewear 102. The eyewear 102 in this example is an electronic eyewear device having a pair of static conductive contact surfaces (not shown) for exchanging data and/or receiving charging electricity. The pair of conductive contacts may each include or be plated with a conductive material such as nickel, copper, brass, gold, or other conductive material or combinations of conductive materials.

The eyewear case 104 includes a first electrical contact 106 and a second electrical contact 108 positioned to resiliently engage the pair of static contact surfaces of the eyewear 102 when the eyewear 102 is positioned within the eyewear case 104. As described below with reference to FIGS. 6A-6E, each electrical contact 106 and 108 includes magnets positioned to repel or attract one another in order to produce a desired force at an electrical contact surface that resiliently engages a corresponding conductive contact surface of the eyewear 102 in order to provide suitable electrical connection there between. The magnets may be Neodymium disc magnets. Other suitable magnets will be understood by one of skill in the art from the description herein. Each of the electrical contacts 106 and 108 may include or be plated with, at the contact surface (and between the contact surface and a transmission line), a conductive material such as nickel, copper, brass, gold, or other conductive material or conductive combinations of materials.

Figure 2:
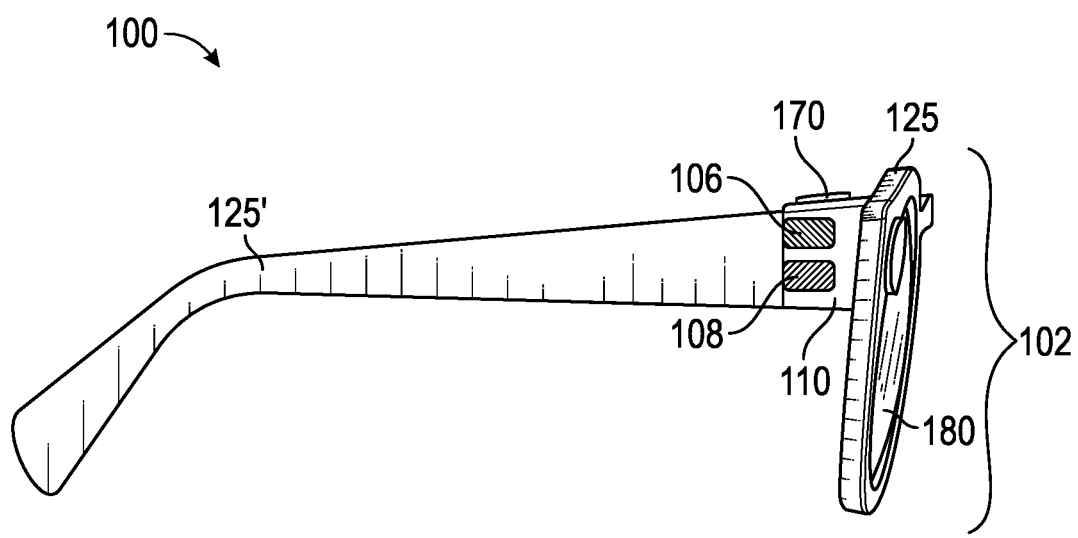
FIG. 2 is a right side view of the right side of eyewear, showing electrical magnetic contacts within the right side of the eyewear's frame.

FIG. 2 depicts the eyewear 102 in accordance with another example. In the example of FIG. 1, the eyewear 102 included static contact surfaces. In FIG. 2, the eyewear 102 includes resilient electrical contacts 106 and 108 such as described above with reference to the eyewear case 104. In accordance with this example, the corresponding electrical contacts of the eyewear case 104 may be static or may also be resilient.

The eyewear 102 includes a frame 105, which holds an optical assembly 180 such as a lens, piece of glass or metal, or a display. The eyewear 102 has a right lateral side 170 including a right chunk 110 and a right temple 125. The electrical contacts 106 and 108 are embedded in a rear face of the right chunk 110, such that when the right temple 125 is in a wearable position (as shown in FIG. 2), the electrical contacts 106 and 108 are concealed by a front face of the right temple 125. Folding the right temple 125, such as in FIG. 1, exposes the electrical contacts 106 and 108 contacts for mating with corresponding contacts of the eyewear case 104.

Figure 3:
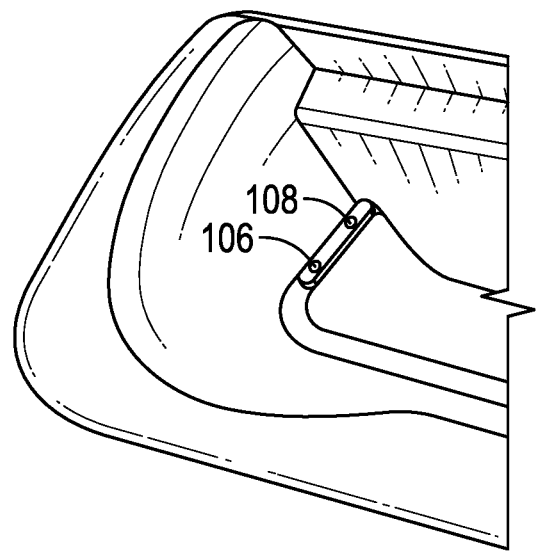
FIG. 3 is a partial perspective view of the right side of an eyewear case, showing the electrical magnetic contacts within the right side of the eyewear case, designed to interface with eyewear.

FIG. 3 depicts a portion of the eyewear case 104 with the eyewear 102 removed. The electrical contacts 106 and 108 in the right side of the case 104 are positioned to receive corresponding conductive contact surfaces of the eyewear 102 when the eyewear 102 temples are folded, exposing the electrical contacts of the eyewear 102.

Figure 4A:
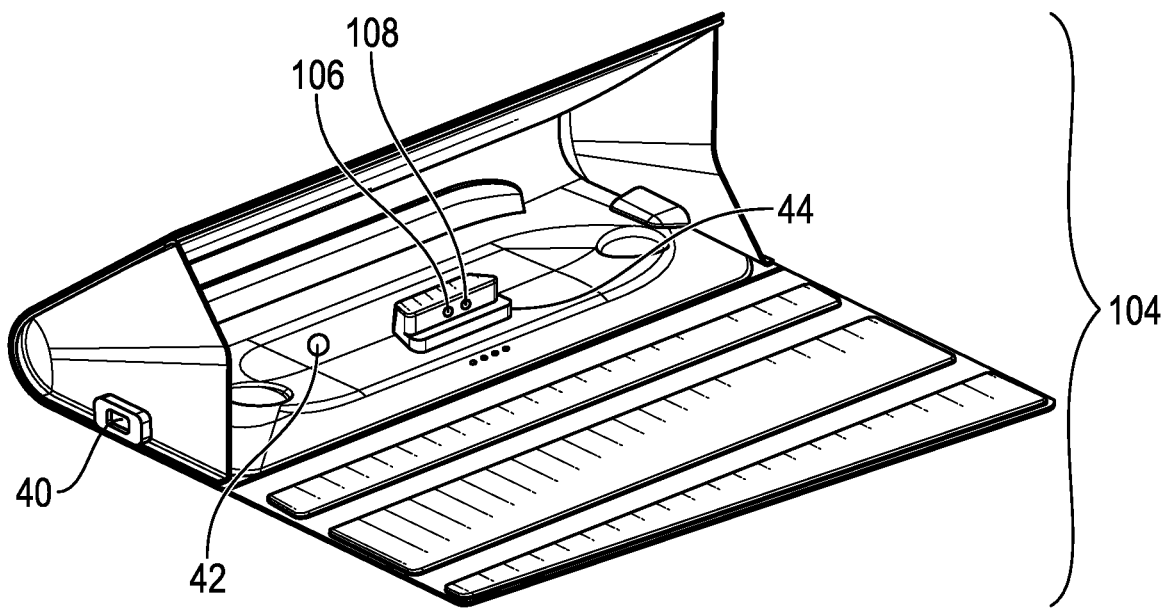
FIG. 4A is an illustrative view of an eyewear case, where the electrical magnetic contacts are located to align with the nose piece of a cradled eyewear.

FIG. 4A depicts an eyewear case 104 in accordance with another example. The eyewear case 104 has a charging port 40 and an internal battery 42. The eyewear case 104 is able to receive electricity from an outside source, such as a wall socket or a DC electrical transformer, at the charging port 40 and store that electricity within the internal battery 42. In this example, the resilient electrical contacts 106 and 108 are positioned to engage a bottom of a bridge of the eyewear 102 when positioned with the eyewear case 104. This example allows for transferring electricity from the internal battery 42 to the eyewear 102 via contacts in the bottom of the bridge of the eyewear 102, or transferring electricity from the charging port 40 directly to the eyewear 102, or communicating data from a computer with a data cable connected to the charging port 40.

Figure 4B:
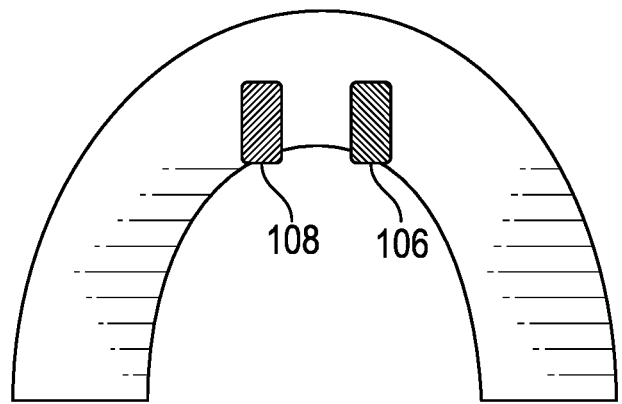
FIG. 4B is an illustrative view of the bridge of eyewear, where the electrical magnetic contacts are located in the eyewear's nose bridge.

FIG. 4B depicts a bridge of the eyewear 102 with resilient electrical contacts 106 and 108 within the bottom of the bridge of the eyewear 102. In accordance with this example, the corresponding electrical contacts in the eyewear case 104 may be static or may also be resilient. In an alternative example, the contacts in the bridge for the eyewear 102 may be static and the corresponding contacts in the eyewear case 104 may be resilient such as depicted in FIG. 3.

Figure 5:
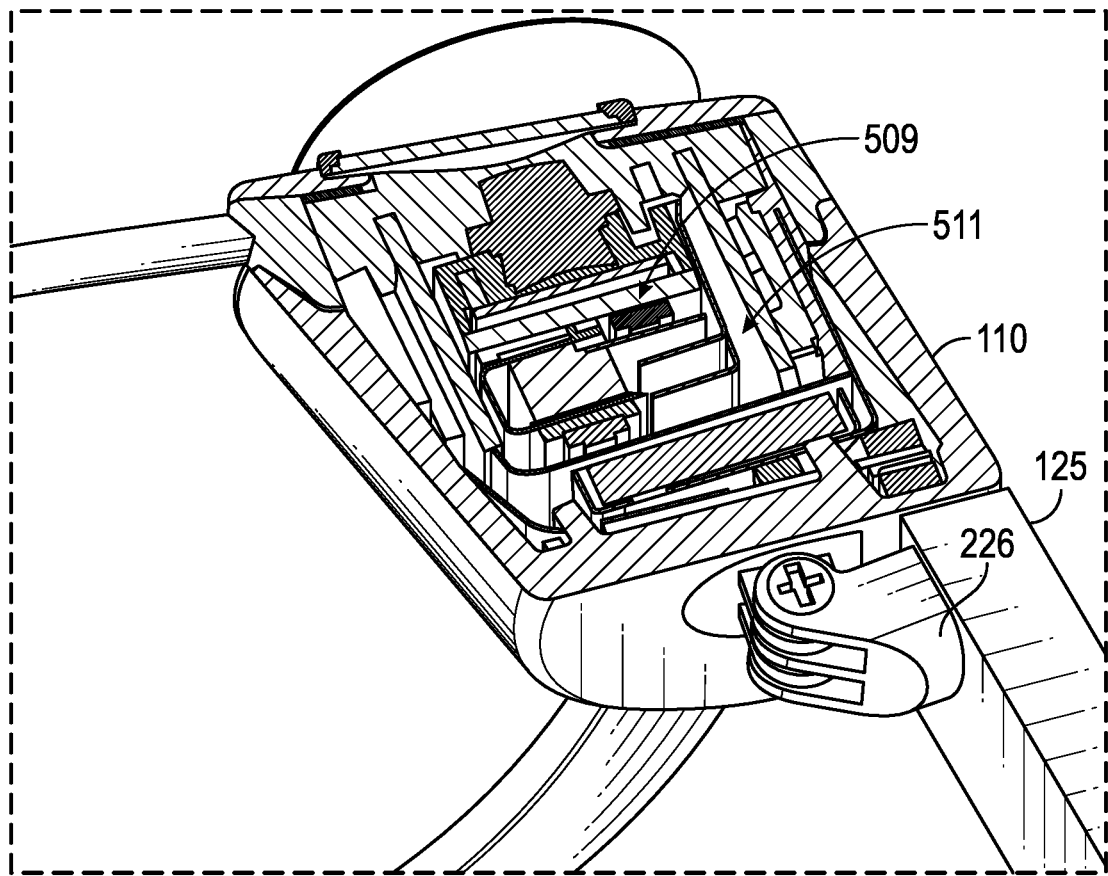
FIG. 5 is a cutaway perspective illustration of the right side of eyewear, showing how the electrical components work together and the connection between the electrical magnetic contacts and the eyewear's battery.

FIG. 5 is a cutaway view illustrating a right chunk 110 of the eyewear 102. In FIG. 5, the electrical contacts 106 and 108 are hidden from view behind the right temple 125 when the right hinge 226 is fully extended in an unfolded state. In this example, a front face of the right temple 125 fully cover the electrical contacts.

The illustrated eyewear 102 includes a battery 509. The battery 509 provides power to the eyewear 102. When the eyewear 102 is connected to an external power source such as the eyewear case, the battery 509 charges by drawing power from the external power source. The connection to the external power source is facilitated by the resilient electrical contacts 106 and 108, which allow transfer of electricity from the external power source to the battery 509.

The illustrated eyewear 102 also includes a processor 511. The processor 511 is configured to perform computational operations within the eyewear 102. When the eyewear 102 connects to an external data source such as the eyewear case 104, the processor 511 communicates data to and from the external data source. The connection to the external data source is facilitated by the resilient electrical contacts 106 and 108, which allow transfer of data to/from the external data source to the processor 511.

FIG. 6A-6E depict examples of an electrical contact 106. In the illustrations, the letter "N" designates the north side of the magnet and the letter "S" designates the south side of the magnet.

Figure 6A:
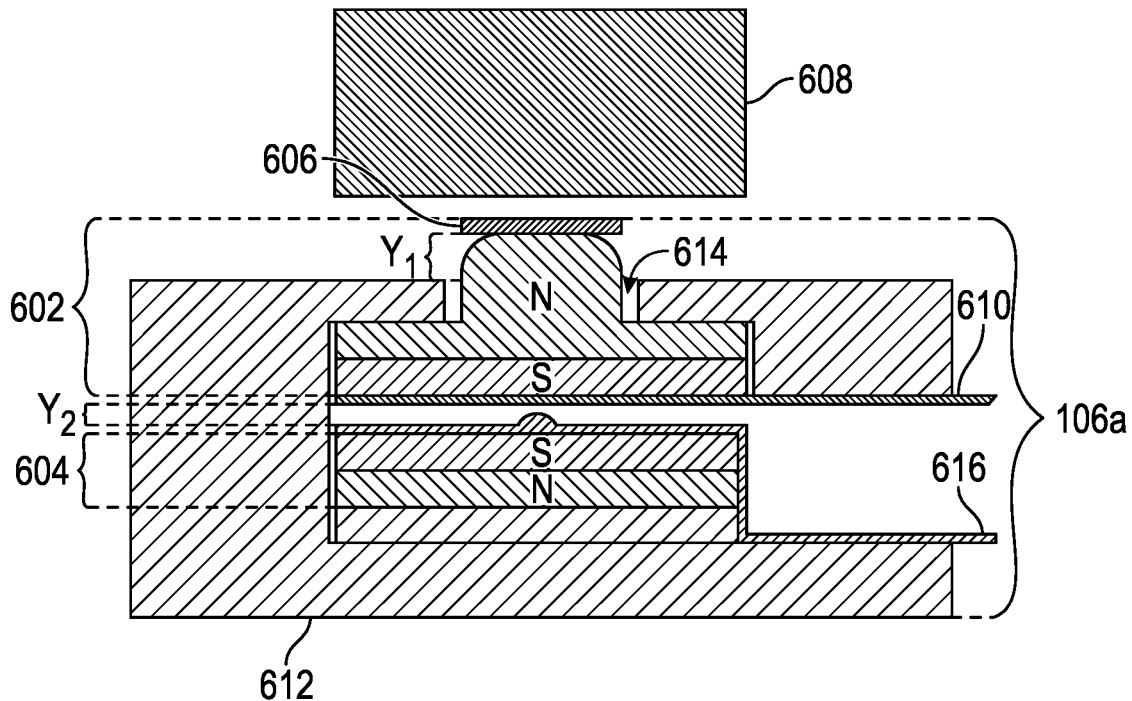
FIG. 6A is a cross sectional view of an electrical magnetic contact where a single housing holds two repelling magnets with electrical contacts on their common faces.

FIG. 6A is a cross sectional view of one example of an electrical contact 106a utilizing a pair of magnets 602 and 604 to provide a resilient electrical contact surface 606 for engaging a corresponding conductive contact surface 608. The electrical contact surface 606 may be an exposed surface of the magnet 602 or may be a conductive coating on the surface of the magnet 602. The conductive coating may be a nickel, copper, brass, gold, or other conductive material or combinations of conductive materials deposited/plated on the surface of the magnet 602. The conductive coating may extend to a transmission line/wire 610. The transmission line/wire 610 may be a conductive copper trace coupled to electronics within a device.

A non-conductive housing 612 supports the magnets 602 and 604. The non-conductive housing 612 defines a channel within which the first magnet 602 moves with respect to the second magnet 604, which remains stationary. The non-conductive housing 612 additionally defines an opening 614 through which the resilient electrical contact surface projects for engaging the corresponding conductive contact surface of another device. The non-conductive housing 612 may be a non-conductive polymer. The channel and magnets 602/604 may be sized such that the maximum protrusion of the magnet 602 ($Y_1$) is greater than the maximum distance between the magnets 602/604 ($Y_2$). This arrangement ensures that at least a portion of the magnet 602 will extend outside the channel for engagement with the conductive contact surface 608.

The magnets 602 and 604 are configured and positioned to repel one another (e.g., 50 grams of force in a direction extending through the electrical contact surface). Thus, the second magnet 604 urges the first magnet 602 (and the electrical contact surface 606) away from the second magnet 604. When the corresponding conductive contact surface 608 is brought into contact with the electrical contact surface 606, the repulsive forces of the first and second magnets 602 and 604 provide a force that contributes to the mating force between the two contact surfaces, thereby reducing electrical resistance.

A second lead wire 616 may be provided. When the force exerted by the corresponding conductive contact surface 608 exceeds the repulsive forces between the magnets 602 and 604, the first magnet 602 will move toward the second magnet 604. Once the first magnet 602 moves a sufficient distance to close a gap between the first wire 610 and the second wire 616, the wires 610 and 614 connect to compete a circuit, allowing electricity or data to flow.

Figure 6B:
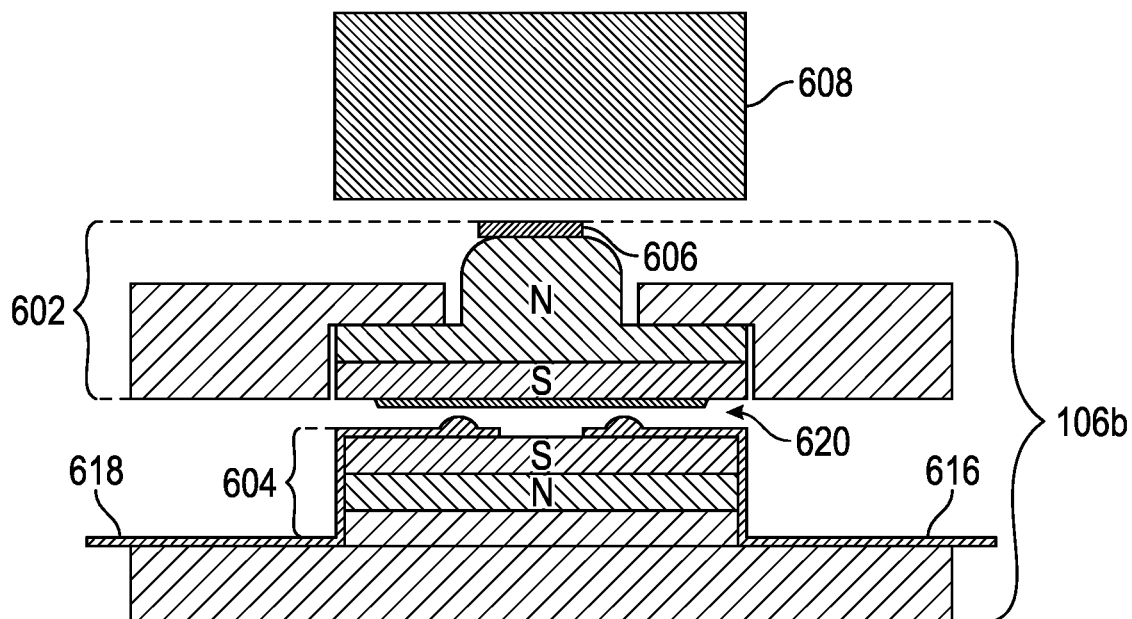
FIG. 6B is a cross sectional view of an electrical magnetic contact where a single housing holds two repelling magnets with two non-connected magnetic contacts on one common face, and a conductive plate on the second common face.

FIG. 6B is a cross sectional view of another example of an electrical contact 106b utilizing a pair of magnets 602 and 604 to provide a resilient electrical contact surface 606 for engaging a corresponding conductive contact surface 608. This electrical contact system is similar to FIG. 6A with regard to the general structure and placement of the support structure, magnets, protrusion, and external force, but has a different transmission line/wire connection scheme.

The electrical contact 106b includes a second transmission line 618 on the second magnet 604 and a contact bridge/plate 620 on a bottom surface of the first magnet 602. The two transmission lines 616 and 618 do not touch, with each transmission line having an internal contact surface. The contact bridge/plate 620 is positioned above the internal contact surfaces of the two transmission lines 616 and 618. The magnets are configured and positioned to repel one another. Thus, the second magnet 604 urges the first magnet 602 (and the contact plate 620) away from the second magnet 604 (and the first and second transmission lines 616 and 618). When the corresponding conductive contact surface 608 is brought into contact with the electrical contact surface 606, the repulsive forces of the first and second magnets 602 and 604 provide a force that contributes to the mating force between the two contact surfaces, thereby reducing electrical resistance.

When the force exerted by the corresponding conductive contact surface 608 exceeds the repulsive forces between the magnets 602 and 604, the first magnet 602 will move toward the second magnet 604. Once the first magnet 602 moves a sufficient distance to close a gap between the contact bridge/plate 620 and the internal contact surfaces of the first and second transmission lines 616 and 618, the transmission lines 616 and 618 connect though the bridge/plate 620 to compete a circuit, allowing electricity or data to flow. In one example, no charge is provided to the contact surface 606 until it is connected to the transmission lines 616 and 618, thereby avoiding corrosion due to charge on the contact in the presence of moisture.

Figure 6C:
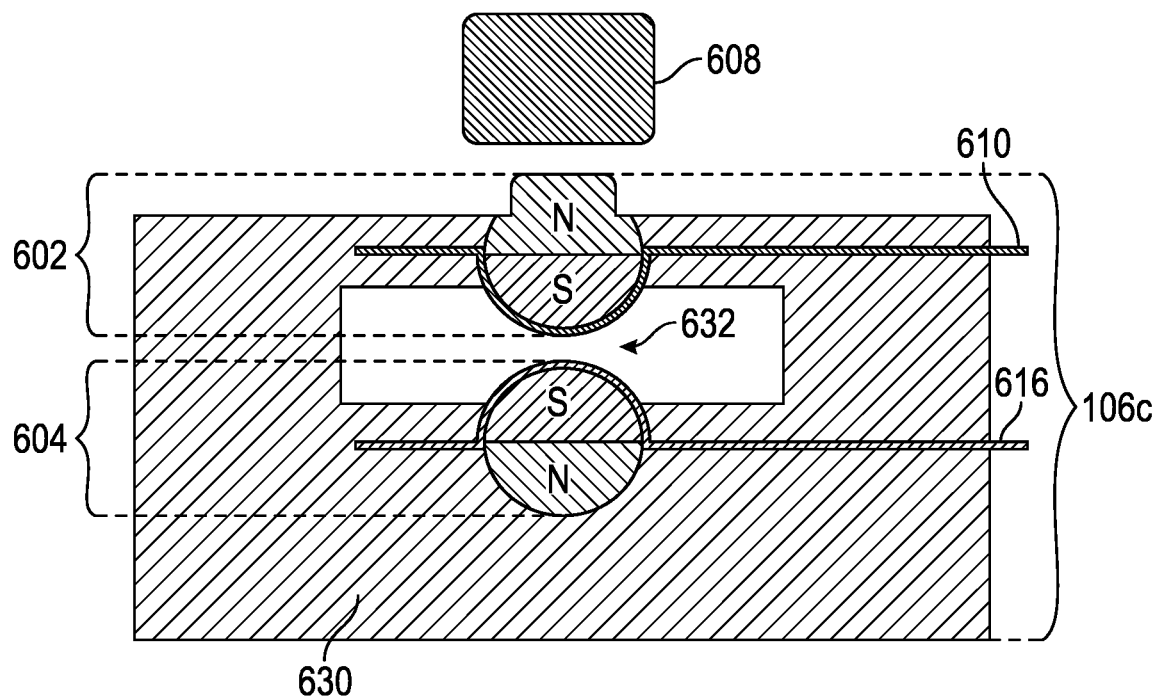
FIG. 6C is a cross sectional view of an electrical magnetic contact where a single housing holds two repelling magnets with electrical contacts on their common faces, where the housing is made of a sealed elastomer.

FIG. 6C is a side cross sectional view of another example of an electrical contact 106c system utilizing magnets 602 and 604. The electrical contact 106c includes a compliant support 630 made of a compliant material such as silicon or an elastomeric polymer that supports the first magnet 602 in relation to the second magnet 604 with a cavity including a gap 632 there between in the absence of external contact force from the conductive contact surface 608. The elastomeric polymer is configured to at least partially encapsulate the magnets 602 and 604 in order to prevent dirt, grime, etc. from collecting within the electrical contact. In FIG. 6C, a portion of the first magnet (or electrical conductor thereon) extends from the contact 106c for contact with the corresponding conductive contact surface 608.

When the force exerted by the corresponding conductive contact surface 608 exceeds the repulsive forces between the magnets 602 and 604 and an additionally resilient force, if any, of the compliant support 630, the first magnet 602 will move toward the second magnet 604. Once the first magnet 602 moves a sufficient distance to close the gap 632 between the transmission lines 610 and 616, the transmission lines 610 and 616 connect to compete a circuit, allowing electricity or data to flow.

Figure 6D:
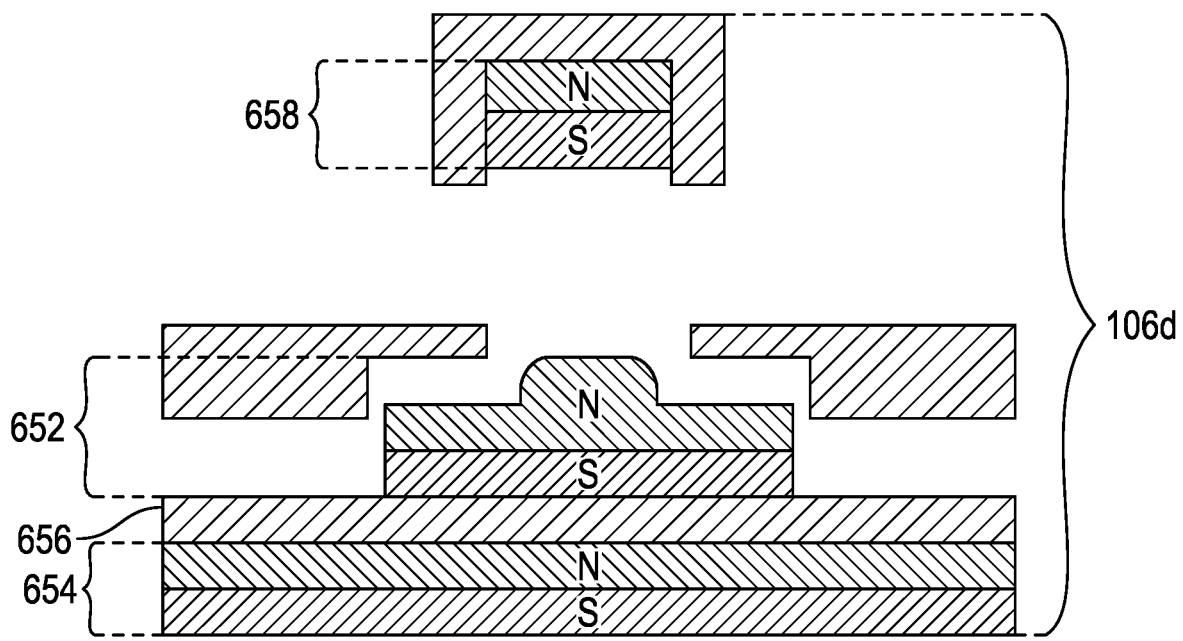
FIGS. 6D and 6E are a cross sectional views of an electrical magnetic contact with two housings hold three magnets.
Figure 6E:
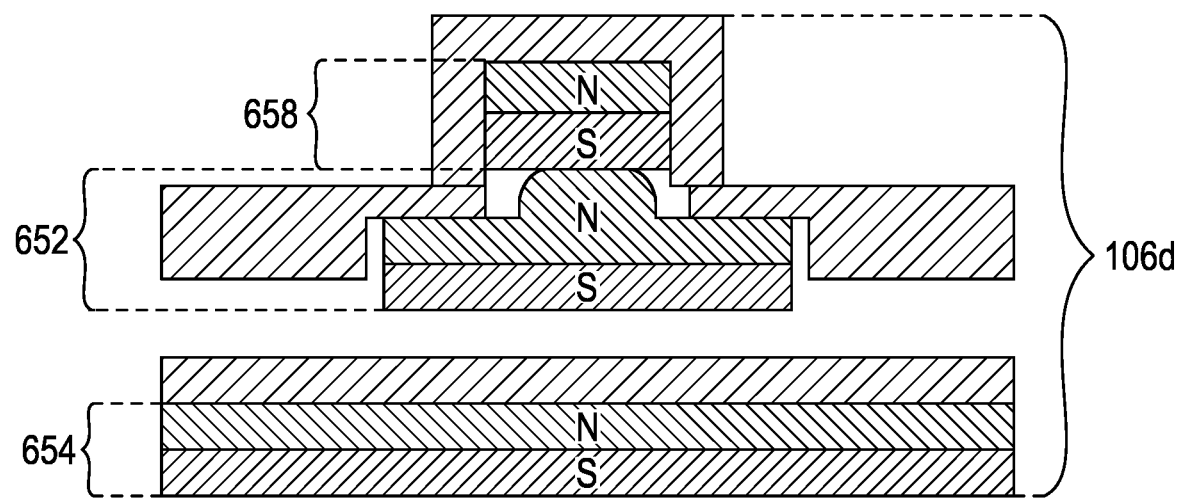

FIGS. 6D and 6E are cross sectional views of another example electrical contact system 106d utilizing magnets 652 and 654. The contact system 106d includes a first magnet 652 and a second magnet 654 that are configured and positioned to attract one another. The first magnet 652 is configured to move within a channel with respect to the second magnet 654, which is stationary. A non-magnetic material 656 may be positioned between the first and second magnets 652 and 654 to prevent the magnets from coming into contact with one another and having a magnetic attraction force that is too high to overcome.

The contact system 106d additionally includes a third magnet 658. The third magnet 658 is configured to attract the first magnet 652 when the device including the third magnet 658 (e.g., eyewear) comes within a threshold distance (e.g., close proximity; 5 millimeters or less) with the device including the first magnet 602 (e.g., the case). FIG. 6D illustrates that prior to coming within the threshold distance the attractive force between the first and second magnets 652 and 654 exceeds the attractive force between the first and third magnets 652 and 658, resulting in the first magnet (and electrical conductive surface) remaining within the support structure. FIG. 6E illustrates that after coming within the threshold distance the attractive force between the first and third magnets 652 and 658 exceeds the attractive force between the first and second magnets 652 and 654, resulting in the first magnet 652 (and electrical conductive surface) moving toward the third magnet 658 and protruding from the support structure.

FIGS. 6D and 6E omit transmission lines for ease of illustration. It will be understood, however, that transmission line such as found in the examples described above with reference to FIGS. 6A-6C may be added to the contact illustrated in FIGS. 6D and 6E.

Figure 7A:
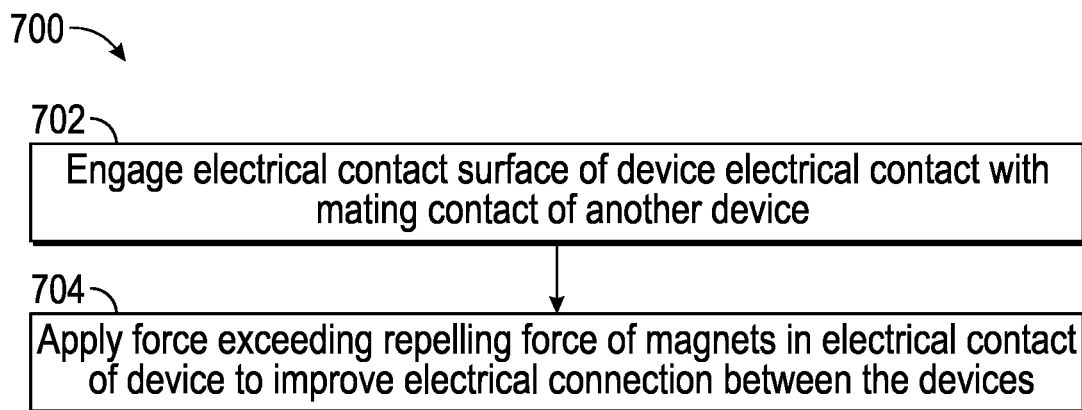
FIG. 7A is a flowchart depicting a process utilizing an electrical magnetic contact system with repelling magnets to form an electrical connection.

FIG. 7A is a flowchart 700 depicting a process utilizing an electrical magnetic contact system with repelling magnets such as described above with reference to FIGS. 6A-6C to form an electrical connection. Other systems for implementing the steps described below will be understood by one of skill in the art from the description herein.

In block 702, the electrical contact surface of one device (e.g., eyewear case) engages an electrical contact surface on a second device (e.g., eyewear). The electrical contact surface of at least one device includes a pair of repelling magnets. In block 704, upon engagement of the two electrical contact surfaces with sufficient force to overcome the repelling force of the pair of repelling magnets, electrical connections are established and electricity and/or data can flow between the devices.

Figure 7B:
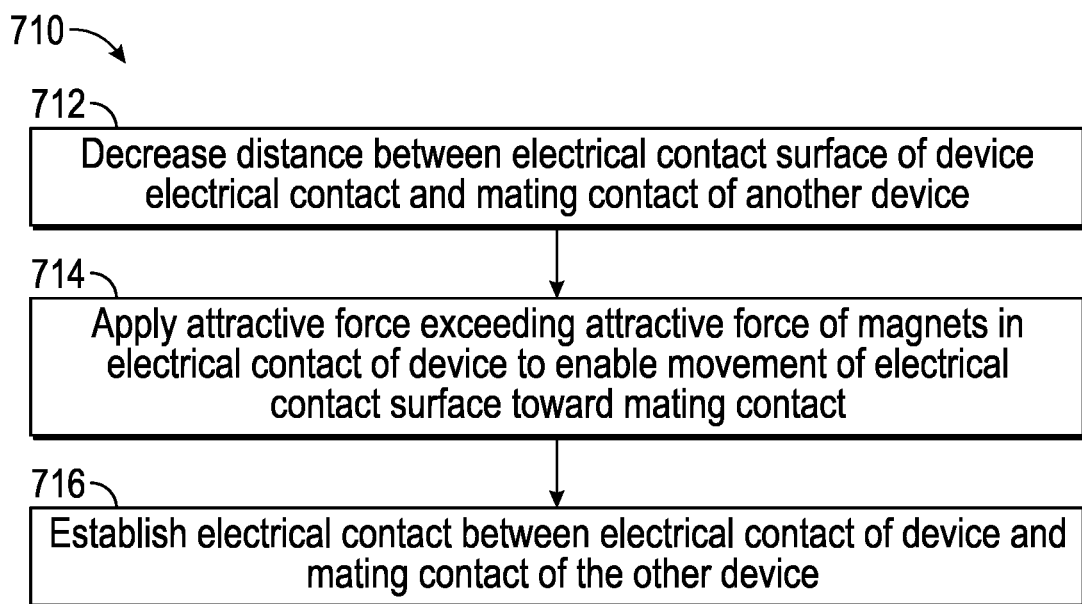
FIG. 7B is a flowchart depicting a process utilizing an electrical magnetic contact system with attracted magnets to form an electrical connection.

FIG. 7B is a flowchart 710 depicting a process utilizing an electrical magnetic contact system with attracting magnets such as described above with reference to FIGS. 6D and 6E to form an electrical connection. Other systems for implementing the steps described below will be understood by one of skill in the art from the description herein.

In block 712, the distance decreases between a device with a first magnet (e.g., eyewear) and a device with a pair of magnets (e.g., eyewear case). The pair of magnets are configured and positioned to attract one another with a first attractive force.

In block 714, apply a second attractive force with the first magnet to the pair of magnets in order to overcome the first attractive force by decreasing a distance between the first magnet and the pair of magnets. This magnetic force exceeds the magnetic force between, for example, a bottom magnet 654 and an exposed magnet 652 (FIGS. 6D and 6E), thereby moving the electrical contact surface on the exposed magnet 652 toward the mating contact of the exterior magnet 658. In block 716, electric contact is established between the device with the exposed magnet 652 and the electrical contact of the mating exterior magnet 658, allowing electricity and/or data to flow.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed:

1. An electronic assembly comprising:
   an eyewear case including:
      a housing; and
      a conductive contact surface supported by the housing; and
   eyewear including:
      a support structure;
      an electronic component supported by the support structure;
      an electrical contact coupled to the electronic component and supported by the support structure, the electrical contact including an electrical contact surface configured to engage the conductive contact surface of the eyewear case, a first magnet attached to the electrical contact surface, and a second magnet that is positioned to attract or repel the first magnet; and
      a transmission line coupled between the electronic component and at least one of the electrical contact surface, the first magnet, or the second magnet;
   wherein the housing defines an opening for receiving the eyewear.

2. The electronic assembly of claim 1, wherein the eyewear includes a bridge configured to receive a nose of a wearer, the electrical contact surface is positioned in the bridge of the eyewear, and the conductive contact surface is positioned to engage the electrical contact surface of the eyewear with the conductive contact surface when the eyewear is positioned with the opening of the eyewear case.

3. The electronic assembly of claim 1, wherein the eyewear case includes another electrical contact including the conductive contact surface configured to engage the electrical contact surface of the eyewear, a third magnet attached to the conductive contact surface, and a fourth magnet positioned to attract or repel the third magnet.

4. The electronic assembly of claim 1, wherein the first magnet and the second magnet are positioned to repel one another, the transmission line is attached to at least one of the electrical contact surface or the first magnet, and the electrical contact further comprises:
   a channel encompassing at least one of the first magnet or the second magnet, the channel configured to enable movement of the first magnet with respect to the second magnet such that the first magnet is positioned further away from the second magnet when no force is applied to the electrical contact surface and the first magnet is positioned closer to the second magnet when force is applied to the electrical contact surface.

5. The electronic assembly of claim 1, wherein the first magnet and the second magnet are positioned to repel one another, the transmission line is attached to at least one of the electrical contact surface or the first magnet, and wherein:
the electrical contact further comprises an internal contact surface attached to the second magnet;
the eyewear further comprises another transmission line attached to at least one of the internal contact surface or the second magnet; and
the electrical contact further comprises a channel encompassing at least one of the first magnet or the second magnet, the channel configured to enable movement of the first magnet with respect to the second magnet such that the first magnet is positioned further away from the second magnet when no force is applied to the electrical contact surface and the first magnet is positioned closer to the second magnet when force is applied to the electrical contact surface to interconnect the transmission line and the other transmission line.

6. The electronic assembly of claim 1, wherein the first magnet and the second magnet are positioned to repel one another, the eyewear further comprises another transmission line, and the electrical contact further comprises:
a first internal contact surface attached to the second magnet and the transmission line;
a second internal contact surface spaced from the first internal contact surface and attached to the second magnet and the other transmission line;
a bridge contact attached to the first magnet and positioned to interconnect the first internal contact surface to the second internal contact surface responsive to the relative positions of the first magnet and the second magnet; and
a channel encompassing at least one of the first magnet or the second magnet, the channel configured to enable movement of the first magnet with respect to the second magnet such that the first magnet is positioned further away from the second magnet when no force is applied to the electrical contact surface to prevent interconnection of the first internal contact surface to the second internal contact surface and the first magnet is positioned closer to the second magnet when force is applied to the electrical contact surface to interconnect the first internal contact surface to the second internal contact surface.

7. The electronic assembly of claim 1, wherein the electrical contact further comprises:
a compliant elastomer surrounding the first magnet and the second magnet and defining movement of the first magnet and the second magnet relative to one another, wherein the compliant elastomer includes a cavity positioned between the first magnet and the second magnet.

8. The electronic assembly of claim 1, wherein the first magnet and the second magnet are positioned to attract one another with a first force at a first distance from one another and the eyewear case includes a third magnet configured to attract the first magnet, wherein the support structure and the housing are configured to enable the third magnet to approach the first magnet such that a second force is generated at a second distance between the first magnet and the third magnet to move the first magnet away from the second magnet and toward the third magnet.

9. Eyewear comprising:
an electronic component;
a support structure supporting the electronic component;
an electrical contact coupled to the electronic component and supported by the support structure, the electrical contact including an electrical contact surface, a first magnet attached to the electrical contact surface, and a second magnet that is positioned to attract or repel the first magnet; and
a transmission line coupled between the electronic component and at least one of the electrical contact surface, the first magnet, or the second magnet.

10. The eyewear of claim 9, wherein the electrical contact surface is configured to engage a conductive contact surface of an eyewear case, the support structure includes a bridge configured to receive a nose of a wearer, the electrical contact surface is positioned in the bridge of the eyewear, and the conductive contact surface is positioned adjacent an opening of the eyewear case to engage the electrical contact surface of the eyewear with the conductive contact surface when the eyewear is positioned with the opening of the eyewear case.

11. The eyewear of claim 10, wherein the eyewear case includes another electrical contact including the conductive contact surface configured to engage the electrical contact surface of the eyewear, a third magnet attached to the conductive contact surface, and a fourth magnet that is positioned to attract or repel the third magnet.

12. The eyewear of claim 9, wherein the first magnet and the second magnet are positioned to repel one another, the transmission line is attached to at least one of the electrical contact surface or the first magnet, and the electrical contact further comprises:
a channel encompassing at least one of the first magnet or the second magnet, the channel configured to enable movement of the first magnet with respect to the second magnet such that the first magnet is positioned further away from the second magnet when no force is applied to the electrical contact surface and the first magnet is positioned closer to the second magnet when force is applied to the electrical contact surface.

13. The eyewear of claim 9, wherein the first magnet and the second magnet are positioned to repel one another, the transmission line is attached to at least one of the electrical contact surface or the first magnet, and wherein:
the electrical contact further comprises an internal contact surface attached to the second magnet,
the eyewear further comprises another transmission line attached to at least one of the internal contact surface or the second magnet; and
the electrical contact further comprises a channel encompassing at least one of the first magnet or the second magnet, the channel configured to enable movement of the first magnet with respect to the second magnet such that the first magnet is positioned further away from the second magnet when no force is applied to the electrical contact surface and the first magnet is positioned closer to the second magnet when force is applied to the electrical contact surface to interconnect the transmission line and the other transmission line.

14. The eyewear of claim 9, wherein the first magnet and the second magnet are positioned to repel one another, the eyewear further comprises another transmission line, and the electrical contact further comprises:

a first internal contact surface attached to the second magnet and the transmission line;

a second internal contact surface spaced from the first internal contact surface and attached to the second magnet and the other transmission line;

a bridge contact attached to the first magnet and positioned to interconnect the first internal contact surface to the second internal contact surface responsive to the relative positions of the first magnet and the second magnet; and a channel encompassing at least one of the first magnet or the second magnet, the channel configured to enable movement of the first magnet with respect to the second magnet such that the first magnet is positioned further away from the second magnet when no force is applied to the electrical contact surface to prevent interconnection of the first internal contact surface to the second internal contact surface and the first magnet is positioned closer to the second magnet when force is applied to the electrical contact surface to interconnect the first internal contact surface to the second internal contact surface.

15. The eyewear of claim 9, wherein the electrical contact further comprises:

a compliant elastomer surrounding the first magnet and the second magnet and defining movement of the first magnet and the second magnet relative to one another.

16. The eyewear of claim 15, wherein the compliant elastomer includes a cavity positioned between the first magnet and the second magnet.

17. An eyewear case comprising:

a housing defining an opening for receiving eyewear;

an electronic component contained within the housing;

an electrical contact coupled to the electronic component and supported by the housing adjacent the opening, the electrical contact including an electrical contact surface, a first magnet attached to the electrical contact surface, and a second magnet that is positioned to attract or repel the first magnet; and a transmission line coupled between the electronic components and at least one of the electrical contact surface, the first magnet, or the second magnet.

18. The eyewear case of claim 17, wherein the first magnet and the second magnet are positioned to repel one another, the transmission line is attached to at least one of the electrical contact surface or the first magnet, and the electrical contact further comprises:

a channel encompassing at least one of the first magnet or the second magnet, the channel configured to enable movement of the first magnet with respect to the second magnet such that the first magnet is positioned further away from the second magnet when no force is applied to the electrical contact surface and the first magnet is positioned closer to the second magnet when force is applied to the electrical contact surface.

19. The eyewear case of claim 17, wherein the first magnet and the second magnet are positioned to repel one another, the transmission line is attached to at least one of the electrical contact surface or the first magnet, and wherein:

the electrical contact further comprises an internal contact surface attached to the second magnet;

the eyewear case further comprises another transmission line attached to at least one of the internal contact surface or the second magnet; and the electrical contact further comprises a channel encompassing at least one of the first magnet or the second magnet, the channel configured to enable movement of the first magnet with respect to the second magnet such that the first magnet is positioned further away from the second magnet when no force is applied to the electrical contact surface and the first magnet is positioned closer to the second magnet when force is applied to the electrical contact surface to interconnect the transmission line and the other transmission line.

20. The eyewear case of claim 17, wherein the electrical contact further comprises:

a compliant elastomer surrounding the first magnet and the second magnet and defining movement of the first magnet and the second magnet relative to one another.

* * * * *